United States Patent
Peekhaus et al.

(10) Patent No.: US 8,015,846 B2
(45) Date of Patent: Sep. 13, 2011

(54) ELONGATION METHOD FOR PRODUCING AN OPTICAL COMPONENT OF QUARTZ GLASS AND PRELIMINARY PRODUCT SUITED FOR PERFORMING THE METHOD

(75) Inventors: Joachim Peekhaus, Biebergemuend (DE); Ralph Sattmann, Aschaffenburg (DE); Joerg Werner, Buedingen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1015 days.

(21) Appl. No.: 11/660,079

(22) PCT Filed: Aug. 15, 2005

(86) PCT No.: PCT/EP2005/008847
§ 371 (c)(1),
(2), (4) Date: Feb. 12, 2007

(87) PCT Pub. No.: WO2006/018263
PCT Pub. Date: Feb. 23, 2006

(65) Prior Publication Data
US 2007/0245773 A1    Oct. 25, 2007

(30) Foreign Application Priority Data
Aug. 14, 2004   (DE) .......................... 10 2004 039 645

(51) Int. Cl.
G02C 6/255 (2006.01)
C03B 37/025 (2006.01)
C03B 37/012 (2006.01)
(52) U.S. Cl. ................ 65/407; 65/406; 65/412; 65/435; 65/475; 65/477

(58) Field of Classification Search ................ 65/385, 65/412, 406, 407, 435, 475, 477
See application file for complete search history.

(56) References Cited

U.S. PATENT DOCUMENTS
4,263,030 A * 4/1981 Kobayashi et al. ............. 65/426
(Continued)

FOREIGN PATENT DOCUMENTS
DE    102 14 029 A1    5/2003
(Continued)

OTHER PUBLICATIONS
JP10182179, Sugama et al., English Translation, Disclosure, (Japanese Appication Published Jul. 7, 1998, English Translation Accessed on PAJ website Jan. 19, 2010).*
(Continued)

Primary Examiner — Jason L. Lazorcik
(74) Attorney, Agent, or Firm — Tiajoloff and Kelly LLP

(57) ABSTRACT

This method for drawing a quartz glass optical component shortens the pulling process and minimizes loss of material. An end face of a quartz glass hollow cylinder forms a tapered end portion to an attachment piece of quartz glass having a bore. The inner bore of the hollow cylinder and the bore of the attachment piece are at least temporarily interconnected fluidically as a passage bore. A cleaning fluid is passed through the inner bore of the hollow cylinder and the passage bore. A core rod of quartz glass, which rests on a contact surface of the attachment piece, is inserted into the inner bore of the hollow cylinder, and the hollow cylinder is continuously supplied to a heating zone, heated therein so as to form a drawing bulb, and the component is continuously drawn therefrom.

15 Claims, 1 Drawing Sheet

U.S. PATENT DOCUMENTS

Figure 1:
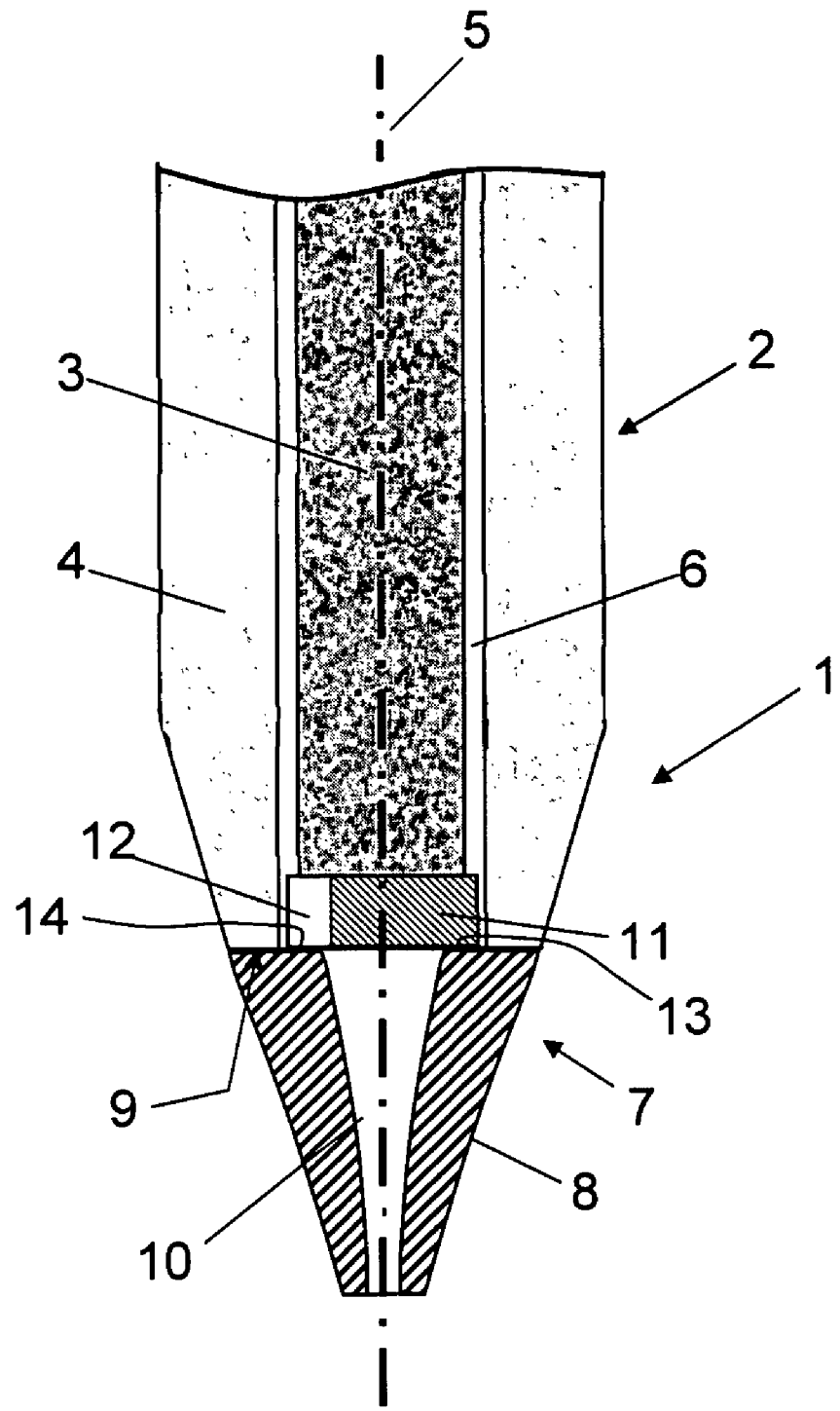

| | | | |
|---|---|---|---|
| 4,812,154 A | 3/1989 | Yoshida | |
| 4,842,635 A | 6/1989 | Spaapen et al. | |
| 5,215,565 A * | 6/1993 | Urano et al. | 65/444 |
| 5,917,109 A * | 6/1999 | Berkey | 65/412 |
| 6,173,588 B1 * | 1/2001 | Berkey et al. | 65/407 |
| 6,422,042 B1 * | 7/2002 | Berkey | 65/397 |
| 6,460,378 B1 * | 10/2002 | Dong et al. | 65/412 |
| 6,484,540 B1 | 11/2002 | Shimada et al. | |
| 6,584,808 B1 * | 7/2003 | Roba et al. | 65/412 |
| 6,644,069 B2 | 11/2003 | Kohmura et al. | |
| 6,649,261 B2 | 11/2003 | Jensen et al. | |
| 6,729,162 B2 * | 5/2004 | Wada et al. | 65/407 |
| 7,028,508 B2 | 4/2006 | Fabian et al. | |
| 7,143,611 B2 * | 12/2006 | Fletcher et al. | 65/412 |
| 7,486,862 B2 * | 2/2009 | Ohga et al. | 385/123 |
| 7,681,416 B2 | 3/2010 | Ganz et al. | |
| 2001/0007197 A1 | 7/2001 | Oga et al. | |
| 2002/0148257 A1 | 10/2002 | Shimizu et al. | |
| 2004/0065119 A1 | 4/2004 | Xiong et al. | |
| 2004/0107735 A1 * | 6/2004 | Fletcher et al. | 65/412 |
| 2004/0144133 A1 | 7/2004 | Fletcher et al. | |
| 2005/0117863 A1 | 6/2005 | Fabian et al. | |
| 2006/0174659 A1 * | 8/2006 | Ganz et al. | 65/412 |
| 2006/0207293 A1 | 9/2006 | Sowa et al. | |

FOREIGN PATENT DOCUMENTS

| | | | |
|---|---|---|---|
| EP | 1129999 A2 | 9/2001 | |
| EP | 1426339 A1 | 6/2004 | |
| JP | 53123939 | 10/1978 | |
| JP | 3265531 | 11/1991 | |
| JP | 10182179 | 7/1998 | |
| JP | 2000128559 A * | 5/2000 | |
| JP | 2001247326 A * | 9/2001 | |
| JP | 2001294438 A * | 10/2001 | |
| WO | WO 02/28789 A1 | 4/2002 | |
| WO | WO 03/106360 A1 | 12/2003 | |
| WO | WO 2005009912 A1 * | 2/2005 | |

OTHER PUBLICATIONS

JP2000128559, Suzuki et al, English Translation, Abstract, (Japanese Appication Published May 9, 2000, English Translation Accessed on PAJ website Jan. 19, 2010).*

JP2001294438, Watanabe, English Translation, Abstract, (Japanese Appication Published Oct. 31, 2001, English Translation Accessed on PAJ website Jan. 19, 2010).*

JP2001247326, Watanabe, English Translation, Abstract, (Japanese Appication Published Sep. 11, 2001,English Translation Accessed on PAJ website Jan. 19, 2010).* espacenet English language abstract for JP 53123939, Oct. 28, 1978.
espacenet English language abstract for JP 3265531, Nov. 26, 1991.
espacenet English language abstract for JP 10182179, Jul. 7, 1998.

* cited by examiner

ELONGATION METHOD FOR PRODUCING AN OPTICAL COMPONENT OF QUARTZ GLASS AND PRELIMINARY PRODUCT SUITED FOR PERFORMING THE METHOD

The present invention relates to an elongation method for producing an optical component of quartz glass.

Furthermore, the present invention relates to a preliminary product suited for performing the method.

Optical components obtained by elongating a preliminary product of quartz glass are optical fibers or solid preforms drawn from the optical fibers.

During elongation, particular emphasis is laid on the pulling phase during which a drawing bulb is formed at the lower softened end of the preliminary product, from which the component can be drawn off with a given geometry and desired dimension. The shaping of the drawing bulb requires some time, which is at the expense of the productivity of the drawing furnace. With an increasing outer diameter of the preliminary product, the time needed for the pulling phase also increases.

The unproductive pulling phase can be shortened considerably by first providing the lower end of the preliminary product with an outer shape resembling a drawing bulb. In the simplest case this is done by conically grinding the lower end.

For expediting the pulling process during elongation of a preform for optical fibers U.S. Pat. No. 6,649,261 B2 suggests that the lower preform end should be made conical by heating and elongating the same prior to the elongation process proper.

A similar pre-pulling of a preform before the fiber drawing process is suggested in WO/02/28789 A1. To this end the preform is pre-shaped with its lower end in a heating device which has a temperature profile similar to the drawing zone of the drawing furnace proper. In the heating device the pulling end of the preform which resembles the later drawing bulb is conically shaped under the action of heat and gravity. The preform with the pulling end pre-formed in this way is subsequently supplied to the drawing furnace and elongated into a fiber.

A further method of this type is described in U.S. Pat. No. 6,644,069B2. Prior to the fiber drawing process the pulling end of the preform is softened such that a mass drips off. The drop is removed and the remaining end resembling a drawing bulb is cooled before a fiber is drawn from the preform.

The known methods shorten the pulling phase, whereby the productivity of the fiber drawing furnace is improved. However, the quartz glass mass drawn off during the pre-pulling represents a loss of material which is noticed as a cost factor especially in the case of the synthetic quartz glass produced at very high costs.

JP 10-182179 A (1988) suggests a method in which an attachment piece in the form of a tubular pull member of a reduced outer diameter is welded to the lower end of a preform for optical fibers to be elongated. The pulling process is shortened thereby and the loss of material is reduced at the same time.

The joining of the attachment piece by welding requires a heat process in which impurities or contamination may be formed or released. In this process particles deposit on the surfaces of the preliminary product and may lead to defects on the boundary surfaces or to fiber breakage during further processing.

It is therefore the object of the present invention to provide a drawing method which is used for producing an optical component of quartz glass and comprises a shortening of the pulling process and a minimization of the material loss and avoids the above-mentioned drawbacks at the same time.

Moreover, it is the object of the present invention to, indicate a preliminary product suited for performing the method according to the invention.

As for the method, said object starting from the above-indicated method is achieved according to the invention by a method which comprises the following steps:

a) a end face of a hollow cylinder of quartz glass is connected with formation of a tapered end portion to an attachment piece of quartz glass having a bore, in such a manner that the inner bore of the hollow cylinder and the bore of the attachment piece are at least temporarily interconnected fluidically with formation of a passage bore;

b) a cleaning fluid is passed through the inner bore of the hollow cylinder and through the passage bore, c) a core rod of quartz glass which rests on a contact surface of the attachment piece is inserted into the inner bore of the hollow cylinder, and d) the hollow cylinder is continuously supplied, starting with the tapered end portion, to a heating zone, heated therein zonewise with formation of a drawing bulb and the component is continuously drawn therefrom.

The hollow cylinder of quartz glass is a tubular semifinished product for producing optical fibers, particularly a cladding tube of a coaxial arrangement consisting of a plurality of cylindrical quartz glass components which comprise a core rod and a cladding tube surrounding the core rod.

Prior to the elongation process proper, the hollow cylinder is provided, as is known from the prior art for preforms, with a pulling end resembling a drawing bulb, which facilitates the pulling process and shortens the pulling phase. The pulling end is formed completely or for the greatest part by an attachment piece which is butt-welded to the quartz glass cylinder and may consist of a less precious quartz glass, e.g. of waste material or residual quartz-glass pieces. Much more precious hollow-cylinder material of quartz glass can thereby be saved during formation of the drawing bulb.

The hollow cylinder, of quartz glass is thus provided with a tapered end portion which is formed completely or in part by the attachment piece. The tapered end portion can extend into the hollow cylinder portion.

The hollow cylinder of quartz glass surrounds a core rod. The core rod is a rod of quartz glass with a radially inhomogeneous refractive index profile. Either solid preforms for optical fibers are produced by collapsing and elongating such a coaxial arrangement of core rod and at least one cladding tube, or the optical fibers are directly drawn from the coaxial arrangement, the last-mentioned method being called "ODD (overclad-during-drawing) method". Such a coaxial arrangement for directly drawing an optical fiber is e.g. described in DE 102 14 029 C2.

An annular gap remains between the core rod, which may also consist of several core rod pieces loosely stacked one upon the other, and the hollow cylinder and optionally between another cladding tube.

The attachment piece comprises a bore which communicates with the inner bore of the hollow cylinder, resulting in the formation of a passage bore through which a cleaning fluid can be passed. This permits a cleaning of the inner wall of the inner bore of the hollow cylinder and thus a removal of contamination caused by the attachment of the attachment piece. Liquids and gases are suited as cleaning fluids (e.g. hydrofluoric acid).

In a vertical orientation the core rod directly or indirectly rests on a contact surface of the attachment piece at the beginning of the elongation process. In a different orientation the core rod directly or indirectly rests at least on the contact surface of the attachment piece.

In the case of an indirect contact (or support) either one or several intermediate elements are provided between core rod and attachment piece, or a cladding tube which surrounds the core rod and in which the core rod is fixed and which, in turn, rests on the attachment piece.

If in the case of a direct contact (or support) the outer diameter of the core rod is greater than the inner diameter of a bore of the tubular attachment piece, with the bore adjoining the hollow cylinder, the core rod is entirely fixed above the attachment piece. Otherwise, the core rod may also project to some extent into the bore of the attachment piece and come to rest on the tapering inner wall thereof, whereby it is centered in radial direction.

The contact surface is meant to be that area on or at which the core rod, an intermediate piece or a cladding tube fixing the core rod is in contact with the attachment piece.

At the beginning of the elongation process the bore of the attachment piece is either still open or it is already closed. The upper portion of the bore which faces the hollow cylinder can be used for a radial centering of the core rod, as has been explained above. The support area of the attachment piece additionally contributes to a defined and reproducible axial fixation of the core rod, i.e. without any other fixing measures that would normally require a hot deformation step and entail additional costs and the risk of an impairment of the quality of the optical component to be produced.

Furthermore, an open bore at the beginning of the elongation process also permits a scavenging of the annular gap between core rod and cladding tube with a protective or cleaning agent, whereby contamination is removed or can be prevented from penetrating into the inner bore of the hollow cylinder.

The attachment piece may already comprise a tapering pulling end during attachment to the hollow cylinder of quartz glass. Preferred is however a procedure in which the attachment piece is welded to the end of the hollow cylinder and subsequently softened and tapered with formation of a taper portion.

The taper portion of the attachment piece is here formed completely or in part by softening and elongation only after attachment to the hollow cylinder. The welding of the attachment piece to the hollow cylinder of quartz glass is thus made easier. The geometry of the taper portion of the attachment piece is adapted to the conditions prevailing in the drawing furnace and to the diameter of the component to be produced. Especially the minimal outer diameter of the attachment piece plays an important role. This diameter should not be much greater than the nominal outer diameter of the optical component to be produced. The attachment piece is therefore elongated with formation of a tapering strand to such an extent that the minimal outer diameter of the strand is approximately equal to the outer diameter of the optical component or only insignificantly larger.

After the taper portion has been formed on the attachment piece, the free end thereof forms a mass of any desired shape which due to its weight can facilitate pulling in the subsequent elongation process. On the other hand, said mass may present an obstacle in the elongation process so that it usually turns out to be more advantageous to separate said end prior to the elongation process. Thus the final formation of the taper portion advantageously comprises a separation of the attachment piece along a separation plane extending through the taper portion.

This yields a taper portion of a defined geometry, especially with a reproducible minimal cross-sectional area (viewed in the direction of the longitudinal axis of the hollow cylinder) which is adapted to the predetermined geometries in the drawing furnace. The separation point is here not automatically positioned at the thinnest point of the taper portion.

For carrying out the cleaning and scavenging operations the attachment piece preferably comprises an open bore in the taper portion.

The bore of the attachment piece narrows during the formation of the taper portion. Said formation is carried out such that the bore remains open up to the end of the taper portion or at least up to the separation point.

For reasons of an economic procedure welding to the hollow cylinder and the formation of the taper portion are carried out in a joint heat process.

In a first work step the attachment piece is welded to the end of the hollow cylinder of quart glass, and in a second work step the taper portion is formed on the attachment piece by elongating the attachment piece to some extent.

It has turned out to be useful when an attachment piece of synthetic quartz glass is used.

The hollow cylinder of quartz glass also consists of synthetic quartz glass. Due to the use of specific material for the attachment piece the two viscosities do not differ or differ only insignificantly, and the radiation transport in the area of the attachment zone is hardly impeded, whereby the attachment process is facilitated. Attachment zone is understood in the following to be the contact region formed between hollow cylinder and attachment piece during the joining of the attachment piece by welding.

The hydroxyl group content is decisive for the viscosity and radiation transport in the case of synthetic quartz glass. With respect thereto, prior to the formation of the attachment zone, the synthetic quartz glass of the attachment piece preferably contains a mean content of hydroxyl groups which differs from that of the hollow cylinder of quartz glass by 5 wt ppm at the most.

However, during the attachment process a surface loading of the quartz glass with hydroxyl groups may take place due to the high temperatures. Especially the area around the attachment zone may therefore show a hydroxyl group concentration higher than that of the remaining quartz glass. However, what is decisive for a successful attachment of the attachment piece is the mean content of the hollow cylinder of quartz glass and of the attachment piece prior to the attachment process. After the attachment process this is not affected by a surface loading of the quartz glass with hydroxyl groups and is expressed by a certain distance from the attachment zone. For these reasons a preliminary product is preferred in which the synthetic quartz glass of the attachment piece in an area at least 1 cm away from the attachment zone shows a mean content of hydroxyl groups which deviates from that of the hollow cylinder of quartz glass by not more than 5 wt ppm in an area at least 1 cm away from the attachment zone.

The attachment piece serves, inter alia, to taper the pulling end of the quartz-glass hollow cylinder to be elongated. This function is facilitated when an attachment piece is used whose maximum outer diameter deviates not more than 10 mm from the outer diameter of the hollow cylinder of quartz glass at is end facing the attachment piece.

Advantageously, the end of the hollow cylinder of quartz glass which faces the attachment piece is configured as an outer cone.

The outer cone of the hollow cylinder partly contributes to the tapered end portion of the preliminary product. Moreover, the minimal outer diameter of the outer cone can easily be adapted to the outer diameter of the attachment piece in the area of the attachment zone, so that a step in the outer diameter is avoided, just like the accompanying changes in diameter during the elongation process, and a rapid adjustment of the desired diameter is facilitated.

The hollow cylinder of quartz glass preferably forms the outer cladding tube of a coaxial arrangement consisting of the core rod and one or several cladding tubes surrounding the core rod.

Apart from supporting and fixing the core rod, the attachment piece may serve to support and fix possible cladding tubes which are provided between the core rod and the hollow cylinder inside the inner bore of the hollow cylinder.

It has also turned out to be useful to provide a spacer disk between the attachment piece and the core rod.

The core rod directly or indirectly rests on the spacer disk and is pressed away by said disk from the attachment zone. This helps to save material, for the component drawn from the attachment zone does normally not yet meet the demands made on dimensional stability and thus constitutes waste. The above measure offers, on the one hand, the possibility of a defined axial positioning of the core rod in the inner bore of the hollow cylinder, resulting on the other hand in the saving of precious core rod material.

The spacer disk preferably comprises openings which permit a gas scavenging at the beginning of the elongation process.

It has turned out to be advantageous when the attachment piece has a minimal outer diameter which is not more than 3 cm greater than the nominal outer diameter of the optical component to be produced.

In the case of an optical component in the form of an optical fiber the minimal outer diameter is thus not more than about 3 cm. During pulling a particularly small drop is thereby formed, which in the fiber drawing furnaces is particularly advantageous because of the small opening widths of possible apertures and coating devices. In the case of an optical component in the form of a solid preform the optimum minimal outer diameter of the attachment piece is slightly above (about 3 cm) or below the nominal outer diameter of the preform.

It has turned out to be useful to close the bore of the attachment piece after the method step b) or before the method step c).

Closing of the bore of the attachment piece after completion of the cleaning process prevents the penetration of contamination into the inner bore of the hollow cylinder, especially at the beginning of the elongation process.

Preferably, the bore is closed by means of a heating burner.

Due to the local heating by the heating burner the bore of the attachment piece can be closed in a defined and rapid manner. Especially the upper area of the bore which faces the hollow cylinder can thereby be maintained, which facilitates fixing of the core rod or of a possibly existing intermediate piece.

In a particularly preferred modification of the method of the invention, the contact surface as a projection in the direction of the longitudinal axis 13 of the hollow cylinder forms an annular surface 14 whose inner diameter is not more than 90% of the inner diameter of the inner bore of the hollow cylinder.

The outer diameter of the annular surface is here formed by the inner wall of the inner bore of the hollow cylinder. The contact surface can extend in a direction perpendicular to or inclined relative to the longitudinal axis of the hollow cylinder. The angle of inclination and the inner diameter of the annular surface projection define the size of the support surface for the core rod. To ensure a safe holding of the core rod, the maximum value for the inner diameter of the annular surface in a projection perpendicular to the longitudinal axis of the hollow cylinder is 90% of the inner diameter of the inner bore of the hollow cylinder.

On the other hand, a small inner diameter of the corresponding annular surface impedes the flow of a cleaning or scavenging medium flowing therethrough. Therefore, the inner diameter is preferably at least 10% of the inner diameter of the inner bore of the hollow cylinder.

In the simplest case the contact surface extends in a horizontal plane. If the outer diameters of hollow cylinder and attachment piece are matched, the attachment piece in the area of the attachment zone has a larger wall thickness than the hollow cylinder.

As for the preliminary product for performing the method of the invention, the above-indicated object is achieved according to the invention by a preliminary product comprising a hollow cylinder of quartz glass and an attachment piece of quartz glass comprising a bore, the hollow cylinder being connected with a end face to the attachment piece with formation of a tapered end portion in such a manner that the inner bore of the hollow cylinder and the bore of the attachment piece are fluidically interconnected with formation of a passage bore, the hollow cylinder of quartz glass being provided as an outer cladding tube of a coaxial arrangement consisting of a core rod and one or several cladding tubes surrounding the core rod, and the attachment piece forming a contact surface for contact with the core rod.

In the preliminary product according to the present invention the attachment piece serves, on the one hand, to provide a hollow cylinder to be elongated with a tapered end portion in the form of a pulling end resembling a drawing bulb before the elongation process, so that the pulling process is facilitated and the pulling phase is shortened. For this purpose a end face of the hollow cylinder has welded thereto an attachment piece which accounts for the tapered end portion either entirely or at least for the greatest part. The attachment piece consists of low-quality quartz glass, for instance of waste material or of residual pieces of quartz glass, thereby saving the more precious hollow cylinder material of quartz glass for the formation of the drawing bulb.

The hollow cylinder is meant to form the outer cladding tube of a coaxial arrangement consisting of a core rod and one or several cladding tubes surrounding the core rod.

To this end the attachment piece is configured on the one hand such that it comprises a bore and is connected to the hollow cylinder on the other hand such that the inner bore of the hollow cylinder and the bore of the attachment piece are in fluidic communication with one another with formation of a passage bore. This yields a continuous opening which permits a cleaning of the inner wall of the inner bore of the hollow cylinder by scavenging with a cleaning fluid after joining the attachment piece by welding.

On the other hand, the attachment piece comprises a contact surface on which the core rod comes to rest directly or indirectly at the beginning of the elongation process.

In the case of an indirect contact (or support in the vertical orientation of the core rod), one or several intermediate elements are provided and the core rod is fixed inside a cladding tube surrounding the rod, which in turn rests on the contact surface of the attachment piece.

If in case of a direct contact (or support) the outer diameter of the core rod is larger than the inner diameter of the bore of the tubular attachment piece, with the bore adjoining the hollow cylinder, the core rod is entirely fixed above the attachment piece. Otherwise, the core rod may project into the bore of the attachment piece to some extent and come to rest on the tapering inner wall thereof, so that it is centered in radial direction. The upper area of the bore which faces the hollow cylinder can therefore be used for radially fixing the core rod, resulting in a defined and reproducible axial fixation of the core rod without other fixing measures being required that would normally call for a hot deformation step and entail additional costs and the risk of impairing the quality of the optical component to be produced. The lower area of the bore of the attachment piece is here either open or closed. In the case of an open bore scavenging with protective or cleaning fluids can also be carried out even after insertion of the core rod.

Contact surface is here understood to be that area on or at which the core rod, an intermediate piece or a cladding tube fixing the core rod gets into contact with the attachment piece at the beginning of the elongation process.

Advantageous designs of the preliminary product according to the invention become apparent from the subclaims. If designs of the preliminary product which are indicated in the subclaims imitate the procedures mentioned in subclaims regarding the method of the invention, reference is herewith made for supplementary explanation to the above observations on the corresponding method claims.

The present invention will now be explained in more detail with reference to an embodiment and a drawing, which schematically shows in FIG. 1: a preliminary product for drawing an optical fiber according to the ODD method in the form of a coaxial arrangement of core rod and cladding tube and with a pulling end formed by a tubular attachment piece.

FIG. 1 shows a preliminary product 1 for drawing an optical fiber, comprising a coaxial arrangement having assigned thereto reference numeral 2 on the whole. The coaxial arrangement 2 consists of a core rod 3 and a cladding tube 4 of quartz glass having longitudinal axes each coaxially extending relative to a vertically oriented central axis 5 of the overall arrangement 2.

The core rod 3 consists of a high-purity synthetic quartz glass which has been produced by depositing $SiO_2$ particles according to the so-called OVD method and which has a core/cladding structure with an inhomogeneous refractive index profile when viewed in radial direction. The core rod 3 which is coaxially arranged relative to the cladding tube 4 in the inner bore thereof has an outer diameter of 50 mm.

The cladding tube 4 consists of high-purity undoped quartz glass having a hydroxyl group content of less than 1 wt ppm, which has also been produced by, outside deposition according to the OVD method. Its outer diameter is 194 mm, and the inner diameter 54 mm, resulting in an annular gap 6 with a gap width of about 2 mm between the cladding tube 4 and the core rod 3.

The pulling end of the preliminary product 1 is conically tapered downwards. The taper portion 7 is partly formed by the coaxial overall arrangement 2 and partly by an attachment piece 8 of quartz glass which is formed in a manner resembling a drawing bulb and which is welded to the lower end of the cladding tube 4 with formation of an attachment zone 9.

The attachment piece 8 which consists of synthetic undoped, but low-quality, quartz glass having a hydroxyl group content of less than 1 wt ppm has an open passage bore 10 tapering from the top to the bottom. The attachment piece directly adjoins the lower end of the cladding tube 4 with its upper end in the area of the attachment zone 9. Its maximum outer diameter is 90 mm, its length is 160 mm and its minimum outer diameter at the free end is 25 mm. The passage bore 10 of the attachment piece 8 tapers from 40 mm in the area of the attachment zone 9 to about 11 mm at the lower end. Hence, the attachment piece 8 has a distinctly greater wall thickness in the area of the attachment zone 8 than the cladding tube 4, thereby providing a horizontally oriented and annular support surface for the support of the core rod 3. The inner diameter of the support surface is about 74% of the inner diameter of the cladding tube 4.

The core rod 3, however, does not directly rest on the attachment piece 8, but is supported via a spacer disk 11 on the attachment piece 8. The spacer disk 11 has a thickness of 30 mm and an outer diameter of 52 mm. It is provided with lateral slits 12 which establish a fluidic connection from the annular gap 6 into the passage bore 10 of the attachment piece 8.

The production of the pulling end in the form of the taper portion 7 and the production of a fiber by elongating the arrangement 2 shall now be described in more detail.

First of all, the lower end of the cladding tube 4 is slightly conically ground to a minimum outer diameter of about 90 mm, as shown in FIG. 1. A tubular piece of quartz glass having the same outer diameter (i.e. 90 mm) is welded onto the conically ground end. The tubular piece is a residual piece of a cladding tube from the current production. For welding the two hollow cylindrical parts the portions facing the butt joint are softened by means of an oxyhydrogen burner and then pressed together, resulting in a firm bond between the cladding tube 4 and the tubular piece. In the same heat process the tubular piece is subsequently softened and elongated by means of a gripper, resulting in the formation of a strand which is tapered towards its free end and has a shape resembling a drawing bulb. In the end the strand is separated at a separation point remote from the attachment zone 9 by 160 mm, the outer diameter being here about 25 mm and the inner bore being still open, resulting in the attachment piece 8 shown in FIG. 1.

The inner bore of the cladding tube 4 and of the attachment piece 8 is subsequently scavenged with hydrofluoric acid, thus cleaned and freed from possible deposits due to the welding of the attachment piece.

Prior to the elongation process the core rod 3 is inserted into the inner bore of the cladding tube 4, the core rod 3 being here supported with its lower end via the spacer disk 11 on the attachment piece 8, thereby assuming a defined axial position and a certain distance from the attachment zone 9.

For drawing an optical fiber according to the ODD method the cladding tube 4 is gripped by means of a gripper, and the whole preliminary product 1 consisting of core rod 3, cladding tube 4 and attachment piece 8 is then supplied in vertical orientation, starting with the lower end, to an annular furnace, it is softened therein zonewise to a temperature around 2050° C. and an optical fiber is drawn off from the softened region in this process. As long as the lower end of the arrangement has not been softened and collapsed yet, a scavenging gas stream of nitrogen is introduced into the inner bore of the cladding tube 4, said gas stream flowing off via the annular gap 6, the slits 12 and the passage bore 10, thereby preventing the penetration of impurities into the arrangement 2. As soon as the lower portion of the preliminary product has been collapsed, a negative pressure of about 1000 mbar is produced and maintained in the inner bore of the cladding tube 4.

The previously formed taper portion 7 effects an accelerated formation of a drawing bulb at the lower end of the preliminary product 1, with a quartz glass mass first detaching due to gravity from the portion in the form of a drop having an outer diameter of about 15 mm. An optical fiber having a diameter of 125 μm is drawn off from the gradually stabilizing drawing bulb.

Instead of a fiber, it is also possible to produce a preform for an optical fiber by collapsing and elongating the preliminary product 1. For instance in an arrangement 1 having a length of 3 m and the above-indicated lateral dimensions, the elongating process yields a preform strand having an outer diameter of 60 mm and an overall length of 30 m. Several preforms are obtained from the preform strand by cutting to length.

The invention claimed is:

1. An elongation method for producing an optical component of quartz glass, said method comprising:
   a) connecting an end face of a hollow cylinder of quartz glass having an inner bore and a tapered end portion to an attachment piece of quartz glass having a bore, such that the inner bore of the hollow cylinder and the bore of the attachment piece are at least temporarily interconnected fluidically so as to form a passage bore,
   b) passing a cleaning fluid through the inner bore of the hollow cylinder and through the passage bore,
   c) inserting a core rod of quartz glass that rests on a contact surface of the attachment piece into the inner bore of the hollow cylinder, and
   d) continuously supplying the hollow cylinder, starting with the tapered end portion, to a heating zone, heating the hollow cylinder therein zonewise so as to form a drawing bulb and continuously drawing the component therefrom;
   wherein the attachment piece has a maximum outer diameter that differs by not more than 10 mm from an outer diameter of the hollow cylinder of quartz glass at an end of the hollow cylinder of quartz glass facing the attachment piece, and
   wherein the end portion of the hollow cylinder of quartz glass engaging the attachment piece is a truncated inwardly-tapering cone.

2. The method according to claim 1, wherein the attachment piece is welded to the end of the hollow cylinder and then softened and tapered so as to form a taper portion.

3. The method according to claim 2, wherein the attachment piece is separated along a separation plane extending through the taper portion.

4. The method according to claim 2, wherein the attachment piece has an open bore in the taper portion.

5. The method according to claim 2, wherein the welding to the hollow cylinder and the formation of the taper portion are carried out in a joint heat process.

6. The method according to claim 1, wherein the attachment piece is of synthetic quartz glass.

7. The method according to claim 6, wherein prior to performing step a) the synthetic quartz glass has a mean content of hydroxyl groups differing from a mean content of the hollow cylinder of quartz glass by not more than 5 wt ppm.

8. The method according to claim 1, wherein the hollow cylinder of quartz glass forms an outer cladding tube of a coaxial arrangement comprising the core rod and one or more cladding tubes surrounding the core rod.

9. The method according to claim 1, wherein a spacer disk is provided between the attachment piece and the core rod.

10. The method according to claim 1, wherein the attachment piece has a minimum outer diameter that is not more than 3 cm larger than an outer diameter of the optical component produced.

11. The method according to claim 1, wherein the bore of the attachment piece is closed after step b) and before step c).

12. The method according to claim 11, wherein the bore of the attachment piece is closed by a heating burner.

13. The method according to claim 1, wherein the contact surface is a projection extending inwardly toward the longitudinal axis of the hollow cylinder, forming an annular surface in the inner bore, said annular surface having an inner diameter that is not more than 90% of an inner diameter of the hollow cylinder.

14. The method according to claim 13, wherein the annular surface has an inner diameter that is at least 10% of the inner diameter of the inner bore of the hollow cylinder.

15. The method according to claim 1, wherein the contact surface extends in a horizontal plane.

\* \* \* \* \*